2,826,583
2-DIPHENYLMETHYL-PIPERIDINE COMPOUNDS

Karl Hoffmann and Jules Heer, Binningen, Ernst Sury, Basel, and Ernst Urech, Binningen, Switzerland, assignors to Ciba Pharmaceutical Products, Inc., Summit, N. J.

No Drawing. Application June 11, 1954
Serial No. 436,228

Claims priority, application Switzerland July 6, 1953

6 Claims. (Cl. 260—293)

This invention relates to the manufacture of 2-diphenylmethyl-piperidine compounds the phenyl radicals of which carry at least one halogen atom, a lower alkoxy group or a lower alkyl group. It also relates to the salts of these compounds.

These new piperidine compounds show a stimulating effect on the central nervous system which is exhibited by an increase of spontaneous motor activity. It can be used for pharmaceuticals having said stimulating effect.

The new compounds are obtained by treating with a hydrogenating agent an appropriately substituted 2-diphenylmethyl-pyridine and, if desired, preparing a salt of a resulting piperidine.

Starting materials which are not known can be prepared, for example, by reacting an appropriate diphenyl acetic acid derivative, such as a diphenyl acetic acid nitrile, with a 2-halogen pyridine, and then splitting off the functionally converted carboxyl group.

The hydrogenation can be carried out with agents which are known for the hydrogenation of a pyridine ring. For example, hydrogenation may be carried out with hydrogen in the presence of a catalyst, advantageously a precious metal catalyst, such as platinum, or in the presence of nickel or copper chromite.

Depending on the procedure used, the new compounds are obtained in the form of bases or salts. From the salts, the free piperidine bases can be obtained in per se conventional manner. From the latter, salts can be made by reaction with an acid suitable for the formation of therapeutically useful salts such, for example, as hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or a therapeutically active acid.

The following examples illustrate the invention, the parts being by weight unless otherwise stated and the relationship of parts by weight to parts by volume being the same as that of the gram to the cubic centimeter.

Example 1

27.95 parts of 2-(p-chlorophenyl-phenyl-methyl)-pyridine dissolved in 150 parts by volume of glacial acetic acid are agitated with 1 part of platinum oxide as catalyst at 40–45° C. in an atmosphere of hydrogen until 3 mols of hydrogen have been absorbed. The glacial acetic acid is evaporated in vacuo, the residue dissolved in water, rendered alkaline with concentrated caustic soda solution and the precipitated oil taken up in ether. After washing and drying the ethereal extract, the solvent is evaporated and the residue distilled in high vacuum. The 2-(p-chlorophenyl-phenyl-methyl)-piperidine of the formula

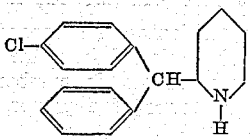

melts at 170–173° C. under 0.01 mm. of pressure.

For the preparation of the hydrochloride the base is dissolved in ethyl acetate and mixed with a solution of hydrogen chloride in ethyl acetate. After recrystallizing twice from a mixture of methanol and ether a colourless crystallizate is obtained which melts at 283–285° C. (with decomposition), (mixture of the 2 stereoisomeric forms).

The 2-(p-chlorophenyl-phenyl-methyl)-pyridine mentioned above may be prepared as follows:

228 parts of p-chlorophenyl-phenyl-acetonitrile are heated in a stirring vessel with 60 parts of pulverized sodamide in 500 parts by volume of absolute toluene for 1½ to 2 hours at 120–130° C. The contents of the flask are then cooled to 70° C., and 238 parts of 2-bromopyridine are introduced dropwise. The exothermic reaction is so controlled by cooling that the temperature does not exceed 85° C. After the addition of the bromo-pyridine the reaction mixture is heated for a further 3 hours at 120–130° C. After cooling, there are cautiously added dropwise, while cooling with ice, first 50 parts by volume of methanol and then 200 parts by volume of water, and then the basic constituents are taken up with hydrochloric acid of 20 percent strength. The acid extract is rendered alkaline with caustic soda solution of 40 percent strength, the resulting crystalline precipitate is filtered off with suction, washed with a large quantity of water, dried on the filter, and recrystallized from methanol. In this manner there is obtained p-chlorophenyl-phenyl-pyridyl-(2)-acetonitrile melting at 82–83° C.

230 parts of p-chlorophenyl-phenyl-pyridyl-(2)-acetonitrile, 700 parts by volume of methanol, 152 parts of potassium hydroxide and 230 parts by volume of water are heated for 10 hours in an autoclave at 215–225° C. After cooling the mixture, the excess of methanol is evaporated, the residue is extracted with ether, the ethereal extract is washed with water and dried over sodium sulfate. After distilling the solvent the residue is distilled in a high vacuum, 2-(p-chlorophenyl-phenyl-methyl)-pyridine passing over at 182–185° C. under 0.01 mm. pressure. It melts after crystallization from petroleum ether at 82–83° C.

Example 2

15.7 parts of 2-(p:p′-dichlor-diphenyl-methyl)-pyridine dissolved in 120 parts by volume of glacial acetic acid are agitated with 0.5 part of platinum oxide in an atmosphere of hydrogen until the theoretical quantity of hydrogen has been absorbed. Working up is carried out in the manner already described. The 2-(p:p′-dichloro-diphenyl-methyl)-piperidine of the formula

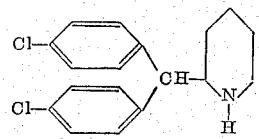

boils at 192–194° C. under 0.01 mm. of pressure and melts after recrystallization from petroleum ether at 105–106° C.

The hydrochloride prepared in the ordinary way melts after recrystallization from a mixture of methanol and ether at 270–272° C. with decomposition.

The above mentioned starting material may be prepared in the manner described in Example 1 by condensing 78.6 parts of p:p′-dichloro-diphenyl-acetonitrile and 13 parts of sodamide in 200 parts by volume of toluene with 55 parts of 2-bromopyridine and then hydrolyzing the condensation product with 57 parts of potassium hydroxide in 85 parts by volume of water and 250 parts by volume of methanol at 220° C. The 2-(p:p′-dichloro-diphenyl-methyl)-pyridine boils at 194–195° C. under 0.01 mm. of pressure.

Example 3

35.8 parts of 2-(p:p'-dimethoxy-diphenyl-methyl)-pyridine, dissolved in 150 parts by volume of glacial acetic acid, are agitated with 1 part of platinum oxide as catalyst at 40° C. under an atmosphere of hydrogen until 3 mols of hydrogen have combined. The platinum is filtered off and the glacial acetice acid evaporated under reduced pressure, the residue is rendered alkaline with concentrated caustic soda solution, and the oil which separates is taken up in ether. The ethereal extract is washed and dried, the solvent evaporated, and the residue distilled. There is obtained the 2-(p:p'-dimethoxy-diphenyl-methyl)-piperidine of the formula

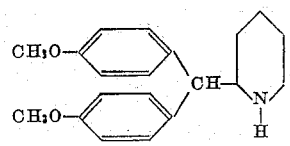

as a colourless oil which boils at 235–238° C. under 0.01 mm. pressure and soon solidifies to form a glassy mass.

The above starting material is obtained by condensing 63 parts of p:p'-dimethoxy-diphenyl-acetonitrile and 12 parts of sodamide in 200 parts by volume of dioxane with 45 parts of 2-bromopyridine by heating at 120° C. for 2 hours and subsequent hydrolysis with 57 parts of potassium hydroxide dissolved in 250 parts by volume of methanol and 85 parts by volume of water for 5 hours at 220° C. The p:p'-dimethoxy-diphenyl-methyl-pyridine melts at 275° C. under a pressure of 0.01 mm.

Example 4

A solution of 15 parts of 2-(p:p'-dimethyl-diphenyl-methyl)-pyridine in 100 parts by volume of glacial acetic acid is shaken in the presence of 0.5 part of platinum catalyst in an atmosphere of hydrogen until the absorption of hydrogen ceases. The platinum is filtered off and the solution worked up as indicated in Example 3. The residue obtained on evaporating the ethereal solution is recrystallized from petroleum ether and the 2-(p:p'-dimethyl-diphenyl-methyl)-piperidine of the formula

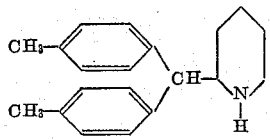

obtained in the form of colourless crystals of melting point 105–106° C. From this base the hydrochloride is obtained in the form of colourless crystals melting at 295–296° C. with decomposition by mixing its ethereal solution with methanolic hydrochloric acid.

The above mentioned starting material can be obtained by condensing 111 parts of p:p'-dimethyl-diphenyl-acetonitrile and 24 parts of sodamide in 350 parts by volume of toluene with 95 parts of 2-bromo-pyridine by heating at 125–130° C. for 2 hours and subsequent hydrolysis with 65 parts of potassium hydroxide dissolved in 95 parts by volume of water and 300 parts by volume of methanol for 6 hours at 220–225° C. The 2-(p:p'-dimethyl-diphenyl-methyl)-pyridine boils at 182–183° C. under 0.01 mm. pressure.

Example 5

14.0 parts of 2-[phenyl-(m:p-dimethyl-phenyl)-methyl]-pyridine, dissolved in 80 parts by volume of glacial acetic acid, are agitated with 0.5 part of platinum catalyst at 40° C. in an atmosphere of hydrogen until 3 mols of hydrogen have combined. The product is worked up as described above. The 2-[phenyl-(m:p-dimethyl-phenyl)-methyl]-piperidine of the formula

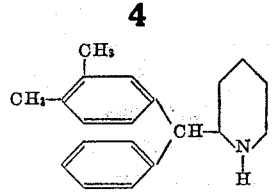

boils at 186–187° C. under a pressure of 0.01 mm.

The aforementioned starting material can be prepared in the manner described in Example 1 by condensing 105 parts of phenyl-(m:p-dimethyl-phenyl)-acetonitrile and 20 parts of sodamide in 250 parts by volume of dioxane with 83 parts of 2-bromo-pyridine and subsequent hydrolysis of the condensation product with 250 parts of concentrated sulfuric acid and 40 parts of water at 150–160° C. for 6 hours. The 2-[phenyl-(m:p-dimethyl-phenyl)methyl]-pyridine boils at 194–195° C. under 0.03 mm. pressure and after recrystallization from petroleum ether melts at 81–82° C.

The new compounds can be used as medicaments, for example, in the form of pharmaceutical preparations which contain them in admixture with a pharmaceutical organic or inorganic carrier material suitable for enteral or parenteral application. For the production of these preparations such substances are concerned as do not react with the new compounds, so for example water, gelatine, lactose, starch, magnesium stearate, talc, vegetable oils, benzyl alcohols, gums, polyalkylene glycols, Vaseline, cholesterol, or other known medicament carriers. The pharmaceutical preparations can take the form of, for example, tablets, dragees, salves, creams, or are in liquid form as solutions, suspensions or emulsions. They are sterilised if desired, and/or may contain auxiliary substances such as preservatives, stabilising, wetting or emulsifying agents, salts which vary the osmotic pressure or buffer substances. They may also contain other therapeutically valuable substances. The pharmaceutical preparations are obtained by the usual methods. For example the following preparations can be made:

| Tablets | 1.0 mg. | 5.0 mg. |
| --- | --- | --- |
|  | Mg. | Mg. |
| 2-(p:p'-dichloro-diphenyl-methyl)-pyridine | 1.0 | 5.0 |
| Talcum | 5.7 | 3.7 |
| Lactose | 52.0 | 50.0 |
| Gelatine | 1.0 | 1.0 |
| Wheat Starch | 30.0 | 30.0 |
| Arrowroot | 10.0 | 10.0 |
| Magnesium Stearate | 0.3 | 0.3 |
|  | 100.0 | 100.0 |

Ampules: Mg.
  2-(p:p'-dichloro-diphenyl-methyl)-pyridine __ 2.0
  Sodium chloride _____ 15.0
  Secondary sodium phosphate _____ 2.0
  Primary sodium phosphate _____ 4.0
  Distilled water to make up 2.0 cc.

What is claimed is:

1. A member of the group consisting of piperidines of the formula

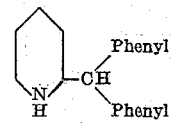

wherein at least one phenyl radical carries at least one substituent but not more than two, one substituent being at least in the para-position and any second meta thereto, said substituents being selected from the group consisting of halogen atoms of atomic number greater than 12, lower alkoxy and lower alkyl groups, and non-toxic salts thereof.

2. 2-(p-chlorophenyl-phenyl-methyl)-piperidine.

3. 2-(p:p'-dichloro-diphenyl-methyl)-piperidine.

4. A non-toxic salt of 2-p:p'-dichloro-diphenyl-methyl)-piperidine.

5. 2-(p:p'-dimethoxy-diphenyl-methyl)-piperidine.

6. A non-toxic salt of 2-(p:p'-dimethoxy-diphenyl-methyl)-piperidine.

References Cited in the file of this patent

UNITED STATES PATENTS

| | | |
|---|---|---|
| 2,355,659 | Lee | Aug. 15, 1944 |
| 2,599,364 | Berger | June 3, 1952 |
| 2,636,881 | Schultz | Apr. 28, 1953 |
| 2,739,968 | Sperber | Mar. 27, 1956 |
| 2,739,969 | Sperber | Mar. 27, 1956 |

OTHER REFERENCES

Simons: Industrial and Engineering Chem., vol. 39, pp. 238 (1947).